United States Patent [19]
Cornelissen et al.

[11] Patent Number: 6,095,914
[45] Date of Patent: *Aug. 1, 2000

[54] DEVICE AND METHOD FOR PROCESSING A SLAUGHTERED ANIMAL

[75] Inventors: Alberthus T. J. J. Cornelissen, Cuyk; Adrianus J. van den Nieuwelaar, Gemert, both of Netherlands

[73] Assignee: Stork PMT B.V., Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/690,039

[22] Filed: Jul. 31, 1996

[30] Foreign Application Priority Data

Aug. 4, 1995 [NL] Netherlands ............... 1000935

[51] Int. Cl.⁷ .................................. A22C 21/00
[52] U.S. Cl. ..................... 452/179; 452/165; 452/178; 452/182
[58] Field of Search ................... 452/179, 182, 452/183, 165, 188, 180, 178

[56] References Cited

U.S. PATENT DOCUMENTS

| | | |
|---|---|---|
| 3,298,500 | 1/1967 | Ensen ............................ 452/188 |
| 3,570,050 | 3/1971 | Draper et al. . |
| 3,715,026 | 2/1973 | Barnes .......................... 452/178 |
| 4,016,624 | 4/1977 | Martin et al. . |
| 4,656,692 | 4/1987 | Villemin et al. . |
| 4,780,930 | 11/1988 | Sparkia . |
| 4,993,114 | 2/1991 | Meyer et al. ................. 452/136 |
| 5,080,630 | 1/1992 | Tieleman et al. ............ 452/177 |
| 5,083,974 | 1/1992 | Martin et al. ................. 452/169 |
| 5,092,815 | 3/1992 | Polkinghorne ................ 3/179 |
| 5,194,035 | 3/1993 | Dillard ......................... 452/165 |

FOREIGN PATENT DOCUMENTS

| | | |
|---|---|---|
| 0 203 015 | 11/1986 | European Pat. Off. . |
| 0 254 332 A1 | 1/1988 | European Pat. Off. . |
| 0 261 420 A1 | 3/1988 | European Pat. Off. . |
| 0 380 714 B1 | 8/1990 | European Pat. Off. . |
| 0 390 979 A1 | 10/1990 | European Pat. Off. . |
| 0 429 887 B1 | 6/1991 | European Pat. Off. . |
| 0 447 773 B1 | 9/1991 | European Pat. Off. . |
| 0 551 156 A1 | 7/1993 | European Pat. Off. . |
| 2 589 452 | 5/1987 | France . |
| 40 08 719 A1 | 9/1991 | Germany . |
| 108481 | 3/1924 | Switzerland ................. 452/177 |

*Primary Examiner*—Willis Little
*Attorney, Agent, or Firm*—John S. Pratt; Kilpatrick Stockton LLP

[57] ABSTRACT

In a device and method for processing a slaughtered animal or a part thereof, the slaughtered animal or the part thereof is conveyed on a holding support of a carrier connected to an overhead conveyor. The holding support is provided with devices for fixing the slaughtered animal or part thereof. The carrier is conveyed past filleting tools disposed in an essentially fixed orientation, while the holding support of the carrier provided with a swivelling device can be swivelled by means of a control device which controls the swivelling device during the passage past the filleting tools, in order to carry out the filleting operations with the filleting tools.

17 Claims, 14 Drawing Sheets

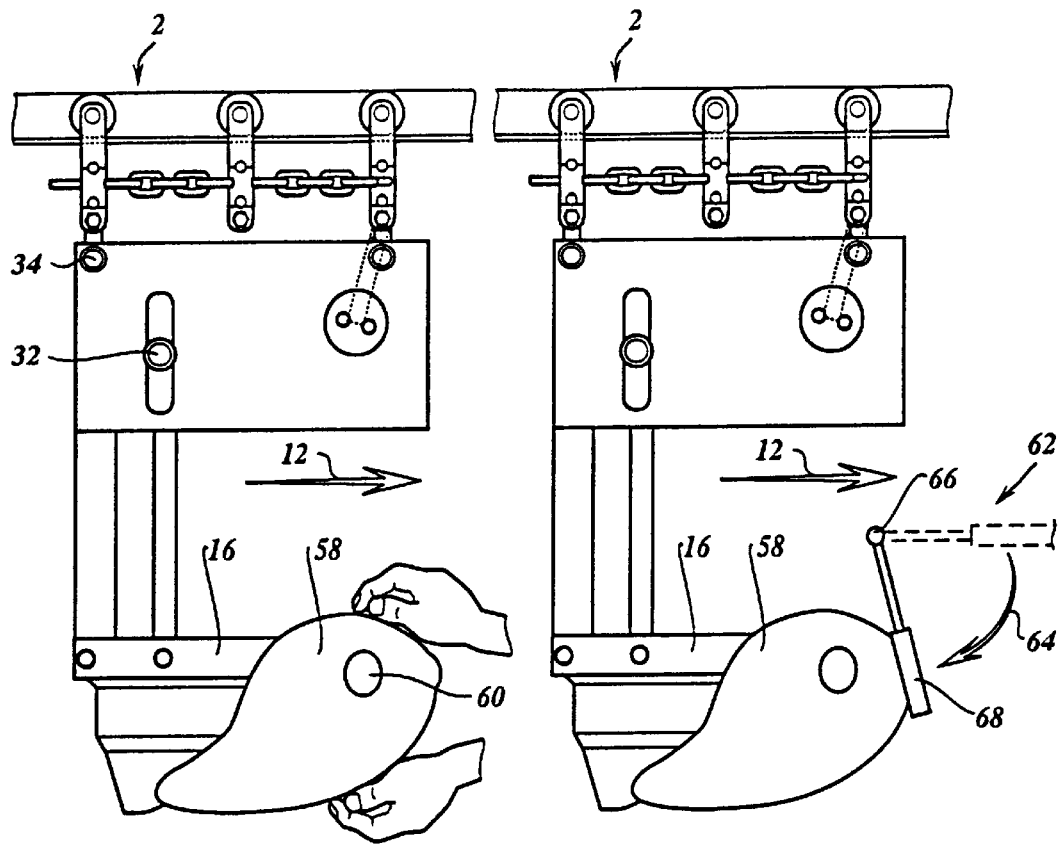
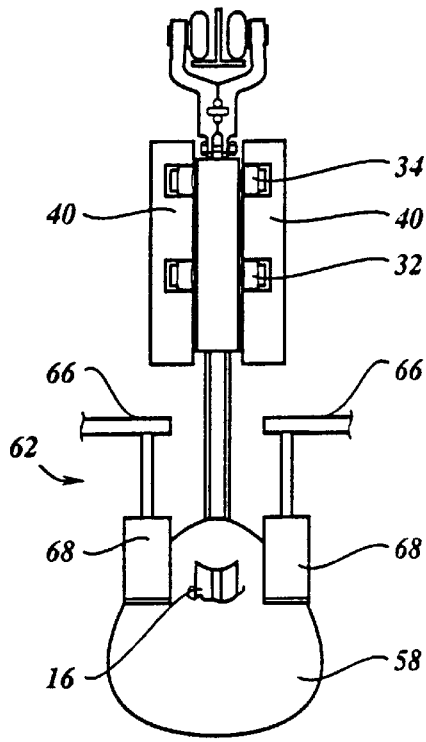
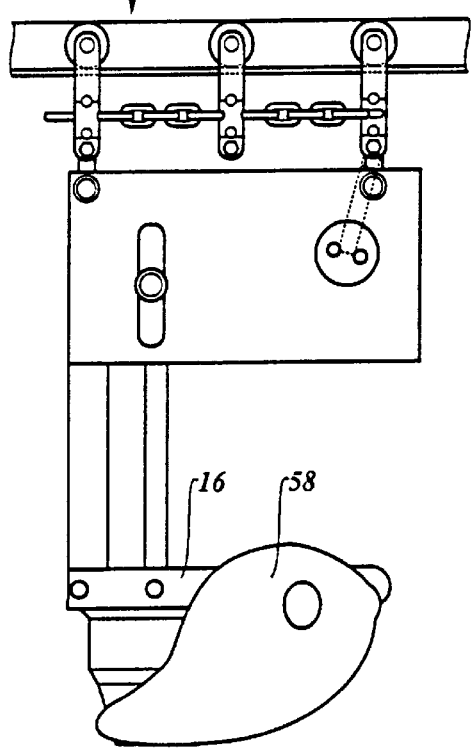
*Fig. 3*
*Fig. 4a*
*Fig. 4b*
*Fig. 5*

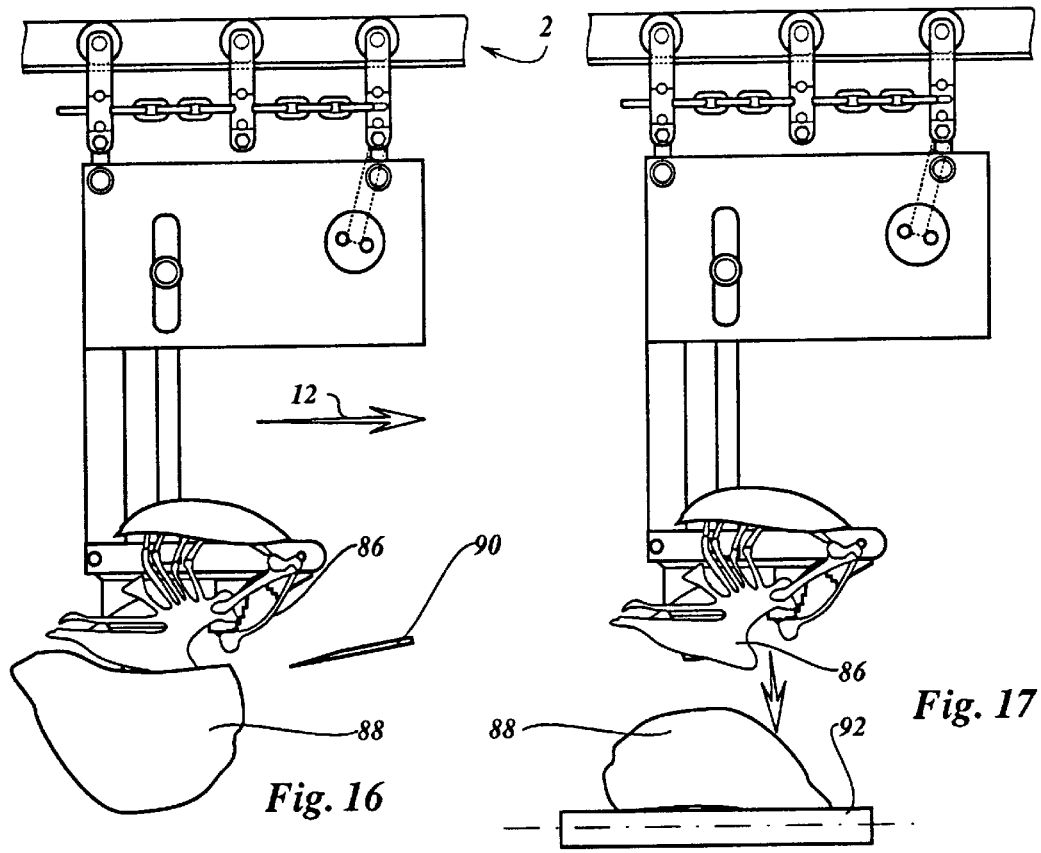
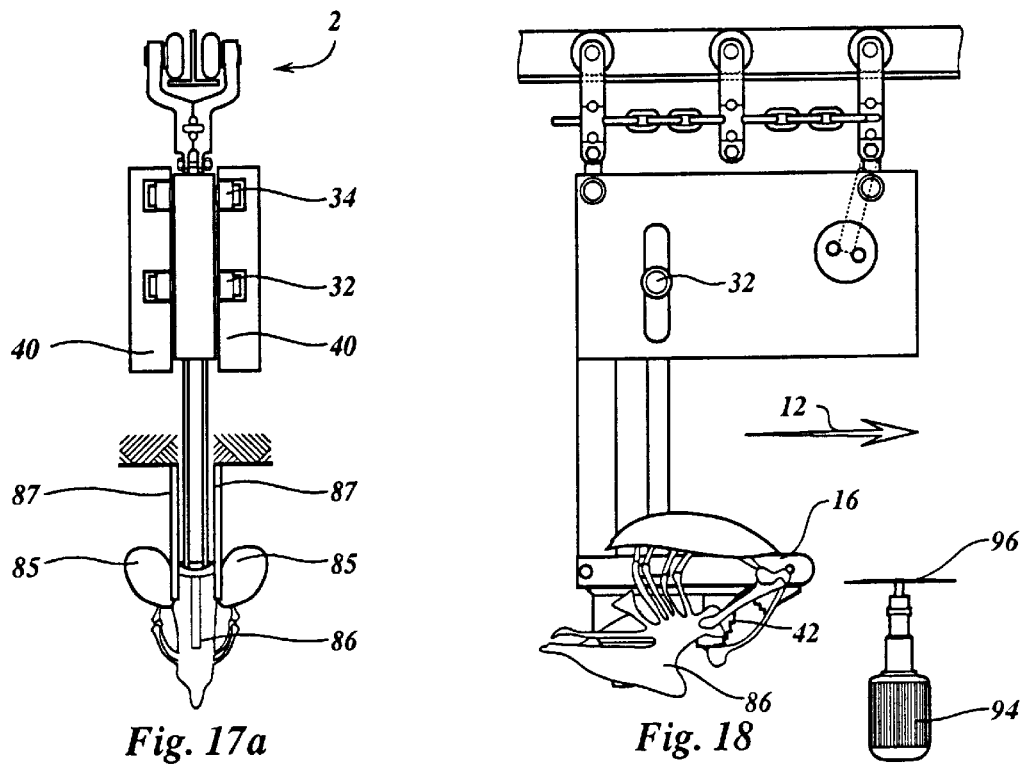

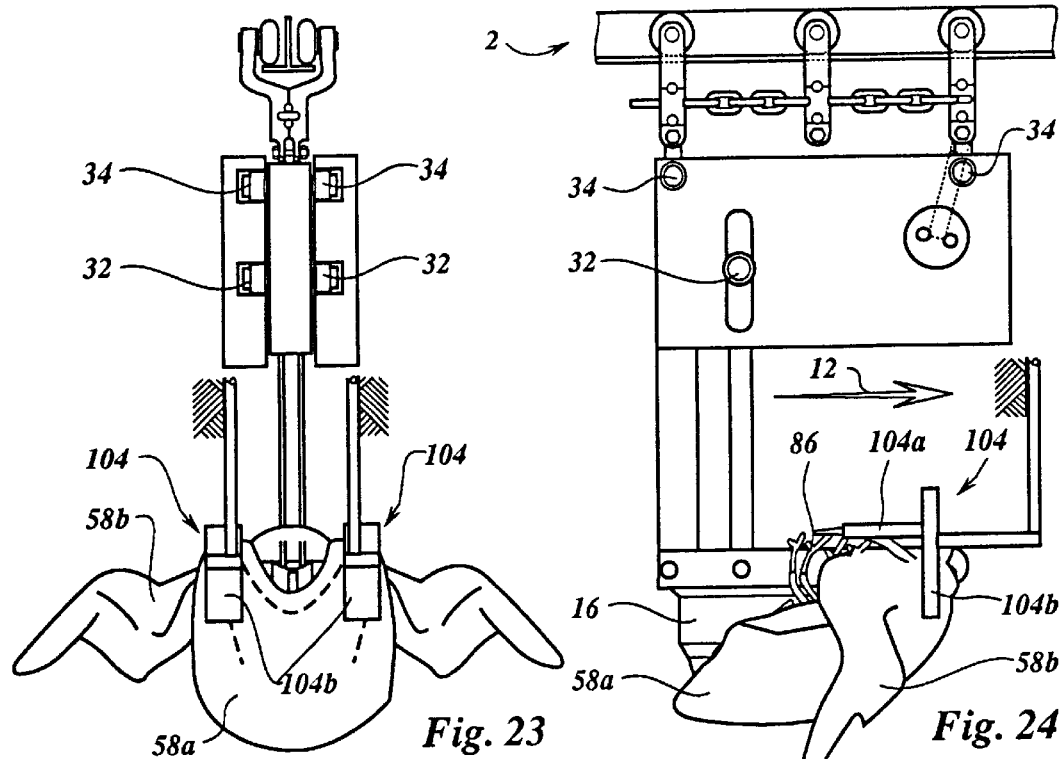
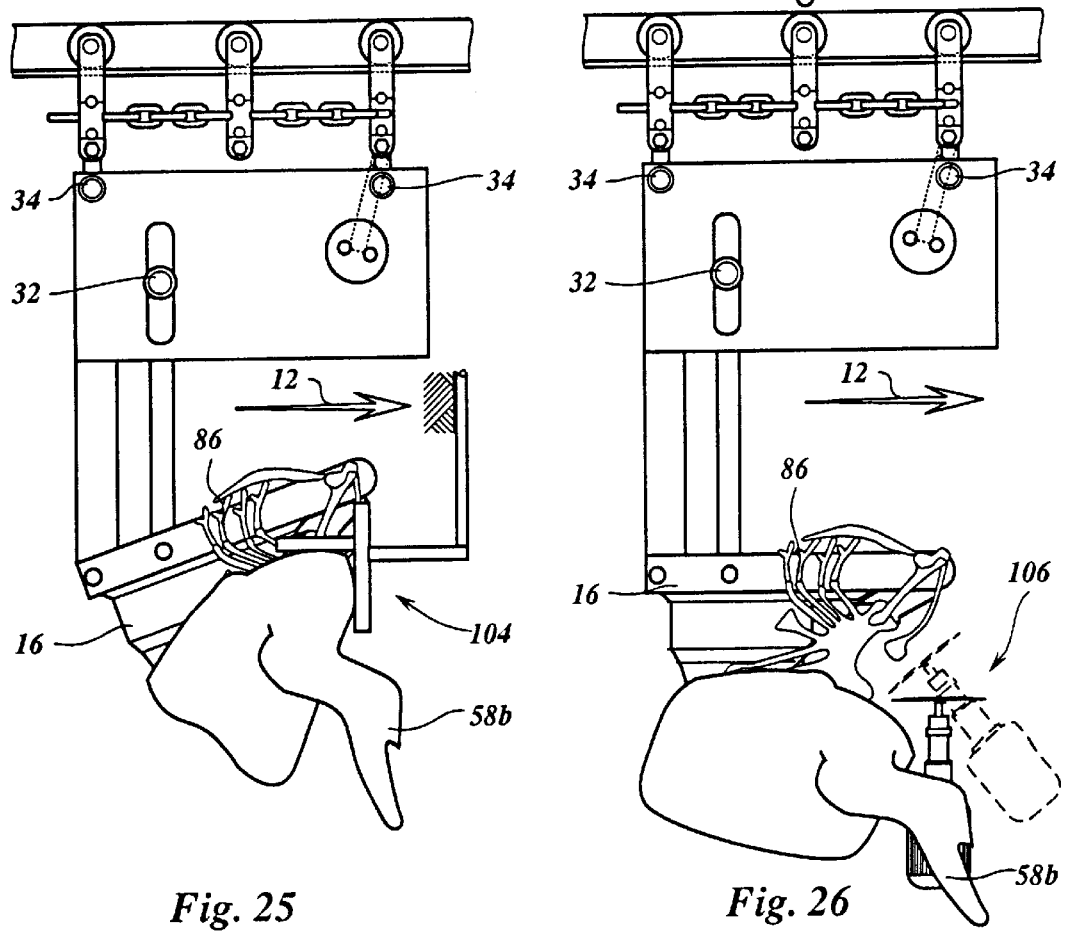
Fig. 23
Fig. 24
Fig. 25
Fig. 26

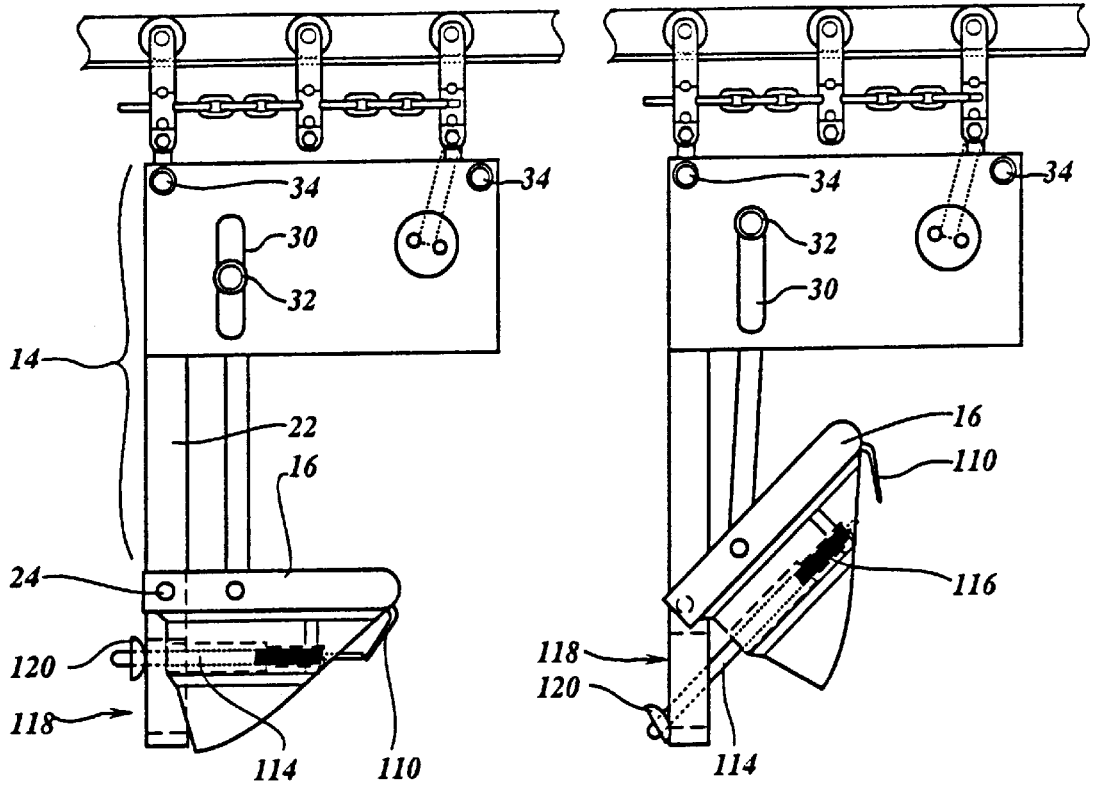
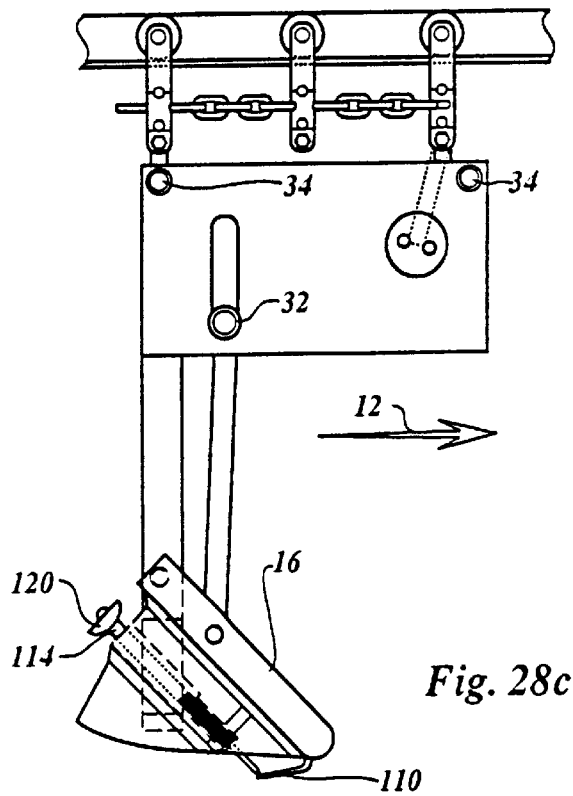
*Fig. 28a*  *Fig. 28b*
*Fig. 28c*

DEVICE AND METHOD FOR PROCESSING A SLAUGHTERED ANIMAL

This application claims priority to Netherlands Application No. 1000935 filed on Aug. 4, 1995.

BACKGROUND OF THE INVENTION

This invention relates to a device and method for processing a slaughtered animal, which device consists of a carrier which is connected to an overhead conveyor and has a holding support for conveying at least part of a slaughtered animal, in particular a front half or a part thereof of a slaughtered bird, which holding support is provided with means for fixing the slaughtered animal or the part thereof on the holding support.

DISCUSSION OF THE PRIOR ART

Such a carrier is known from German Patent Application No. 4,008,719. A front half of a bird is clamped by means of a clamping mechanism (not shown in any further detail) on said carrier, which has an essentially cone-shaped holding support immovably connected to the overhead conveyor, following which, for filleting thereof, the forehalf is conveyed breast side down on the holding support past a number of processing stations for skinning and detaching and removing meat from the front half. For this purpose, the various processing stations are equipped with skinning and filleting tools, such as cutters and scrapers, which are moved relative to the front half in synchronism (in a manner not shown in any further detail) with the movement of the holding supports.

A disadvantage of the prior art described above is the complexity of the control system for the movement of the filleting tools, which leads to a filleting device which is susceptible to faults and requires frequent maintenance. Moreover, a cost-increasing accurate position detection of a holding support moving through a processing station is necessary for the correct timing of the movement of the filleting tools. On the other hand, for tools disposed in a fixed position along the path of the holding support, for example rollers for skinning the front half, the processing cannot be carried out in the optimum manner. Another disadvantage is the rigid arrangement of the overhead conveyor and the processing stations, which arrangement allows little flexibility in the routing of the filleting device.

SUMMARY OF THE INVENTION

The object of the invention is to eliminate the abovementioned disadvantages.

To attain this object, the device according to the invention is characterized in that the carrier comprises a swivelling device which can interact with a control device disposed along the track of the overhead conveyor, in order to swivel the holding support. With such a design of the carrier, filleting tools and a skinning device can be disposed in an essentially stationary manner, and the holding support with the slaughtered animal or a part thereof situated thereon on the contrary can be moved not only on the usual path running essentially parallel to the overhead conveyor, but also relative to the skinning and filleting tools, in such a way that the desired processing operation is obtained in the optimum manner.

In the prior art, with processing devices disposed in a fixed position along the holding supports moving in a fixed path, it was often not possible to make such devices of the optimum technical design, since it was not permissible for some components, such as drive components, to go in the path of the slaughtered animal. An example of this is a skinning device which is shown in the abovementioned German Patent Application No. 4,008,719, the drive components of which had to be made too light. Owing to the fact that the holding support of the carrier according to the invention can swivel, it can be ensured in a simple manner that the slaughtered animal does not come into contact with components of processing devices, so that processing devices can be of the optimum construction.

In a preferred embodiment, the swivelling device is adapted for swivelling the holding support in a vertical plane. In practice, it is found that such a swivelling movement is not only easily possible, but also adequate for carrying out the filleting operations. However, it is also possible to design the swivelling device in such a way that the holding support can be swivelled in a horizontal plane, or can perform a combination of a horizontal and vertical swivelling movement, with the result that a filleting operation can be carried out in the optimum manner.

The carrier advantageously comprises at least one roller or pin with an axis extending essentially at right angles to the direction of conveyance of the overhead conveyor. Such rollers or pins can easily be operated or guided along the path of the overhead conveyor, in order to drive the swivelling device or to stabilize the carrier which is moving along. For the former application, the at least one roller or pin forms part of the swivelling device, and the at least one pin or roller can be moved essentially at right angles to the direction of the axis thereof by the control device for swivelling the holding support, while the carrier can interact with a control device which is provided with a curved slot for accommodating and operating the roller or pin. For the latter application, the carrier preferably comprises at least two rollers or pins fixedly bearing-mounted or fixed thereon, respectively, while the control device is provided with at least one slot for accommodating the rollers or pins, in order to stabilize the carrier.

In an expedient and cheap embodiment, the holding support is connected such that it can pivot at a first point to the carrier, and the roller or pin of the swivelling device is connected to a lever which at a second point is connected such that it can pivot to the holding support, which second point differs from the first point. This embodiment is particularly suitable for swivelling the holding support in a vertical plane, in which case the hinge axes are directed essentially horizontally and at right angles to the direction of conveyance of the overhead conveyor.

In a preferred embodiment, the holding support is essentially elongated, while one end of the holding support can be directed in, or at an acute angle to, the direction of conveyance of the overhead conveyor. Said end can thus be swivelled both upwards and downwards.

In order to fix the slaughtered animal or the part thereof on the holding support, the latter is provided with at least one toothed cam which is movable relative to the surface of the holding support and is designed in such a way that under a biassing force, for example produced by a compression or tension spring, it can grip the inside of the slaughtered animal or part thereof, in particular in the region of the breastbone or the spinal column. The teeth are preferably barbed, so that, once a slaughtered animal or part thereof has been placed on the holding support, it can no longer be removed therefrom.

For a particularly reliable fixing of the slaughtered animal or the part thereof on the holding support, the carrier is designed in such a way that it can interact with pressing means disposed along the path of the carrier, in order to press the slaughtered animal or the part thereof onto the holding support. Such pressing means preferably comprise stops which are disposed along the path of the holding support and can be taken briefly into the path of the slaughtered animal or the part thereof.

After a filleting operation, the carcasses of the slaughtered animals are simple to remove from the holding supports, owing to the fact that the latter are provided on either side with slots extending essentially in the direction of conveyance when the holding support is in a particular swivel position, while the carrier can interact with cutting means which are disposed along the path of the carrier and extend almost to or into said slots, for severing a carcass situated on the holding support.

In another preferred embodiment, which is intended in particular for placing a breast part on a holding support, the fixing means of the carrier comprise a supporting element directed parallel to or forming an acute angle with the surface of the holding support, while the holding support contains a pin which is movable in its lengthwise direction, and one end of which can project under a biassing force, for example from a compression or tension spring, at an angle to the surface of the holding support against the side of the supporting element facing the surface. Such a holding support is known per se, but according to the invention it can now be swivelled and is of a design which is suspended from an overhead conveyor. In order to facilitate the placing of the breast part, the holding support can be designed in such a way that the pin is moved by the swivelling movement of the holding support, so that in a first swivel position the pin is situated below the surface of the holding support, and in a second swivel position, differing from the first swivel position, projects from said surface.

The carrier can be suspended at one or more points in the overhead conveyor. From the point of view of an advantageous load distribution on the overhead conveyor—which is important in particular in the case of heavy slaughtered animals, such as turkeys—and from the point of view of a certain basic stability of the carrier, the latter is suspended flexibly from the overhead conveyor, at at least two points, in particular from trolleys which are movable along a rail and are interconnected by means of a chain, belt, cable, cord or the like. Said suspension of the carrier from the overhead conveyor permits very flexible routing, so that the filleting device of which the carrier forms a part can be adapted in the optimum manner to a desired or already existing filleting route in a slaughterhouse.

The design of the carrier with fixing means in the form of a cam or the like is particularly suitable for use in a device for automatic placing of front halves of slaughtered animals on such carriers with holding supports, which to that end comprise a conveyor for moving along the front halves with the abdominal cavity opening thereof directed essentially at right angles to the direction of movement of the conveyor, which conveyor is adapted to interact with an overhead conveyor with the carriers, the direction of movement of which is essentially at right angles to the direction of movement of the conveyor, while the holding supports of the carriers go into the abdominal cavity opening of the front halves. This means that the carrier on the overhead conveyor can automatically receive on the holding support of the carrier a front half which is on the conveyor moving essentially at right angles to said overhead conveyor. It is also possible to design the carrier with a holding support which is detachable therefrom and can be automatically attached thereto, and which has already been placed beforehand in the abdominal cavity opening of a front half, and in which the holding support is coupled to the remaining part of the carrier during the passage of this remaining part over the conveyor, which moves along the front halves with the holding supports placed therein. In this embodiment the holding supports are automatically caught by the remaining part of the carrier.

According to the invention, a filleting operation carried out on a front half of slaughtered poultry, in particular a turkey, in a filleting device according to the invention is characterized by the following steps: prior to the filleting of the front half, at least two incisions are made, extending almost to or into the ribs, and each extending from the region of a shoulder in the direction of the position of the hip at the same side of the front half; detaching the breast meat from the carcass in the direction of the breastbone; and separating the breast meat from the carcass.

For this processing, the front half to be filleted can have been separated from the remainder of the carcass, and the wings can have been removed from it, but the filleting method described can also be carried out on a carcass which still comprises front half and back half and the wings.

In a preferred embodiment, at least the breast side of the front half is skinned prior to scraping off the breast meat, by making a breast skin incision in the lengthwise direction of and along the breastbone of the carcass, and then pulling away the breast skin from the front half on either side of the breast skin incision. In the prior art, it was usual not to make said breast skin incision, and to pull the skin away from the front half at the position of the breastbone, with the result that skin residues remained behind, particularly at the sides of the front half, after the skinning operation. This disadvantage is avoided by the skinning method described above.

If the front half of the slaughtered poultry still comprises at least part of a wing, the filleting method described earlier is preferably carried out in such a way that, prior to the step of scraping off the breast meat, the shoulder joint is severed at least partially at the back of the carcass, and by means of the wing the meat is detached from the carcass in the region of the shoulder joints, for example by pressing, for example with stops, against the wings, or by pulling, for example with a gripper, on the wings.

For the removal of the back meat from the front half after an incision has been made in the front half between the region of the shoulder and the region of the hip position along the breast side of the shoulder joint, an incision is made at the back side of the front half along the spinal column, and the back meat is then pulled or scraped off the carcass. This is how the so-called oyster pieces are obtained from the poultry.

In a preferred embodiment of the method according to the invention, undesired tissue is removed from the neck region and/or the back region of the poultry prior to scraping off the breast meat. Such tissue consists of fat, glands or the like, and can be removed easily by means of skinning rollers which are known per se, in particular using the carrier provided with a swivelling device according to the invention.

The breast side of the carcass preferably faces essentially downwards during the filleting operation, as a result of which the detachment of the breast meat from the carcass is supported by gravity.

According to the invention, a breast part of slaughtered poultry is filleted in a device according to the invention by carrying out the following steps: scraping away the outer fillet from the flank of the carcass in the region from the collarbone to beyond the processus thoracicus and up to the inner fillet; detaching the membrane connection between the inner fillet and the carcass; and detaching outer and inner fillets from the carcass, if desired the step of removing the wishbone from the carcass can be added to the above mentioned steps. This can be advantegeous for instance for chicken. Making the incision over the collarbone up to the processus thoracicus means that in the step where the outer and inner fillets are pulled away from the carcass the fat on the belly side of the breast cut is also obtained. However, if the abovementioned incision is extended beyond the processus thoracicus, the abovementioned fat is not obtained, which in terms of weight is, of course, a disadvantage but, on the other hand, is welcomed by certain groups of consumers.

It should be pointed out that the measures according to the claims can also be applied in conjunction with any type of conveyor other than an overhead conveyor.

The claims and advantages will be more readily appreciated as the same becomes better understood by reference to the following detailed description and considered in connection with the accompanying drawings in which like reference symbols designate like parts or parts with the same function.

BRIEF DESCRIPTION OF THE DRAWINGS

FIG. 1b shows for the purpose of clarification only the holding support of the carrier according to FIG. 1a;

FIG. 2b shows for the purpose of clarification only the holding support of the carrier according to FIG. 2a;

FIG. 3 illustrates how a front half of slaughtered poultry is placed by hand on a holding support of the carrier according to FIG. 1a or 2a;

FIGS. 3a and 3b illustrate a method and device for automatically placing a front half of slaughtered poultry on a carrier according to FIG. 1a or 2a;

FIGS. 4a and 4b and 5 illustrate in side view and front view, respectively, how a front half is pressed onto a holding support;

FIGS. 16 and 17 illustrate in side view the removal of fillets scraped off the front half;

FIG. 17a illustrates in front view a processing step for obtaining back meat from a front half;

FIGS. 18 and 19 illustrate in side view and front view respectively the removal of a filleted carcass from a holding support;

FIGS. 23, 24, 25 and 26 illustrate in front view and side view, respectively, successive processing steps for obtaining breast meat from a front half with wings;

FIGS. 28a, 28b and 28c illustrate in side view a variant of the embodiment of the carrier according to FIG. 27 and its operation.

DESCRIPTION OF THE PREFERRED EMBODIMENTS

Figure 1A:
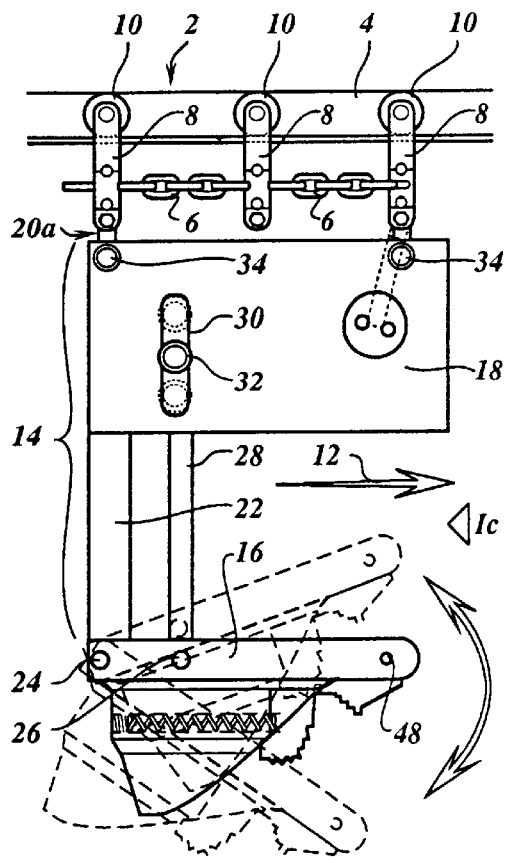
FIG. 1a shows in side view a first embodiment of the carrier according to the invention.
Figure 1B:
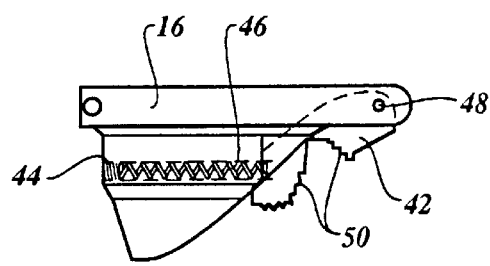
Figure 1C:
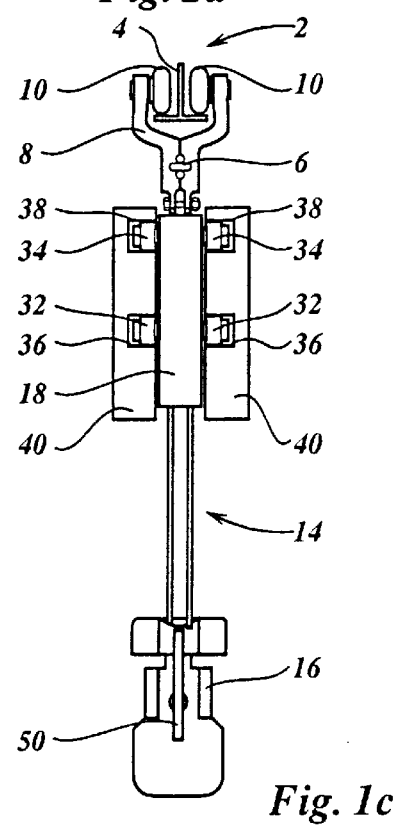
FIG. 1c is a front view in the direction of arrow Ic of the carrier of FIG. 1a, in combination with a control device.

FIGS. 1a, 1b and 1c show an overhead conveyor 2, comprising a rail 4 with an inverted T-shaped cross-section, and a number of trolleys in the form of forks 8 interconnected by means of a chain 6, which forks bear at the ends of their legs rotatably mounted wheels 10, by means of which the forks 8 can be moved along the rail 4 in the direction of arrow 12 by exerting a pulling force on the chain 6. The overhead conveyor 2 described is standard equipment in many slaughterhouses, and is intended for the conveyance of slaughtered animals or parts thereof by means of carriers fixed on the forks 8.

The carrier according to the invention comprises a swivelling device 14 and a holding support 16. The swivelling device 14 comprises a rectangular hollow plate 18, which at its top side is connected flexibly to forks 8 at two points. In this case the connecting mechanism 20 which is fitted in the plate 18, and is indicated at the righthand side of FIG. 1a, permits both rotation of the corresponding fork 8 about a vertical axis and movement of the fork 8 along the top side of the plate 18 in the direction of conveyance 12 or in the opposite direction. The connection 20a between the plate 18 and the fork 8, shown at the lefthand side of FIG. 1a, permits only rotation of the fork 8 about a vertical axis relative to the plate 18. This means that the carrier can follow any curvature of the rail 4 which occurs, without any problems.

An arm 22 is fixed to the plate 18, which arm 22 is connected at its bottom end to the holding support 16 in such a way that said arm pivots about a shaft 24. The holding support 16 is connected to a lever 28 in such a way that it pivots about a shaft 26, the top end of which lever is guided along a slot 30 in the plate 18. The top end of the lever 28 is connected to rollers 32, rotatably bearing-mounted and projecting laterally from the plate 18. Moving the rollers 32 up and down in the slot 30 results in a corresponding swivelling movement of the holding support 16 about the shaft 24, as shown by dashed lines in FIG. 1a. Near the point where it is connected to the forks 8, the plate 18 is also provided with two pairs of rollers 34 which project laterally from the plate 18 and are fixedly bearing-mounted on the plate 18. As can be seen from FIG. 1c in particular, the rollers 32 and 34 can be guided by means of a control device consisting of plates 40 provided with grooves or curved tracks 36 and 38 disposed along the track of the overhead conveyor. The curved tracks 38, which are intended for stabilization of the plate 18, in this case run essentially parallel to the rail 4, while the rollers 32 can be moved by means of the curved tracks 36 relative to the rollers 34 (in the direction of slot 30). A controllable swivelling movement of the holding support 16 in a vertical plane is obtained in this way. In order to facilitate the cleaning of the overhead conveyor 2 the plates 40 can be made movable, for instance pivotable around an axis parallel to the direction of conveyance which axis is positioned between and above the plates itself.

The holding support 16 is shown in greater detail in FIG. 1b and is essentially elongated and cone-shaped, the transverse dimensions of the holding support 16 being adapted as far as possible to the contour of the part of the slaughtered animal or the part thereof which will be facing it when placed on the holding support. The holding support 16 comprises a partially recessed cam 42 with two lobes, which cam 42 is pivotable about a shaft 48 against the spring biasing force supplied by a spring 46 confined by means of a screw 44 in the holding support 16. The cam 42 is provided with barbed teeth 50, which ensure that a slaughtered animal or part thereof which has been pushed sufficiently far onto the holding support 16 can no longer be removed from the holding support 16 in the opposite direction.

Figure 2A:
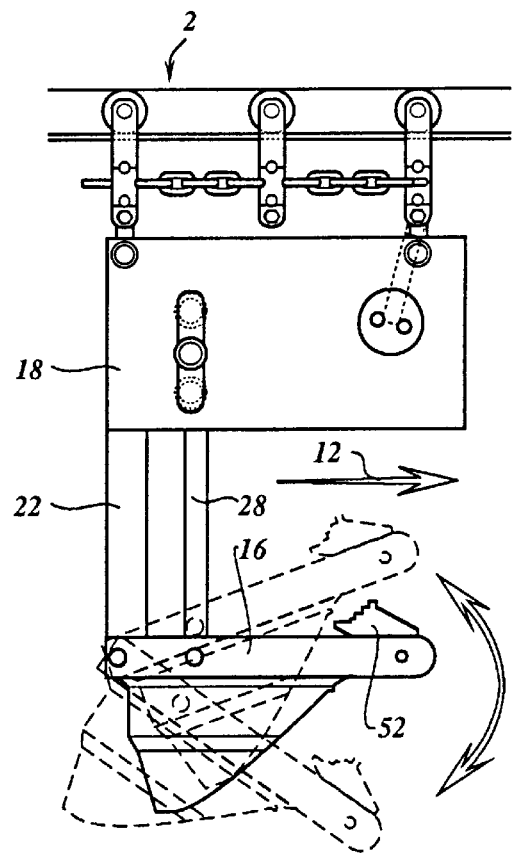
FIG. 2a shows in side view a second embodiment of the carrier according to the invention.
Figure 2B:
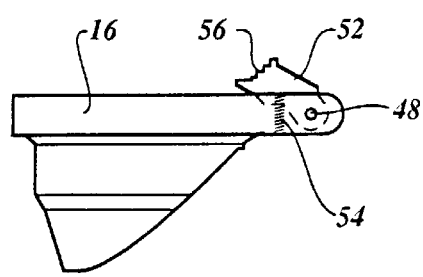

The embodiment of the carrier shown in FIGS. 2a and 2b corresponds largely to the embodiment according to FIGS. 1a, 1b and 1c, with the exception of the cam 42, which has been replaced by a cam 52. The cam 52 is also partially recessed in the holding support 16, is pivotable about a shaft 48, is under an outward directed biasing force which is generated by a spring 54, is provided with barbed teeth 56, and has the effect of the cam 42 described above.

FIG. 3 illustrates how a front half 58 of slaughtered poultry is placed by hand on the holding support 16. The holding support 16 can be provided with either a cam 42 or a cam 52. In the case shown, the wings have already been removed from the front half 58, and a part of the shoulder joints remains at the point indicated by 60. The back of the front half 58 is facing upwards, so that the breast fillets are situated at the underside. The rollers 32 are guided into the position shown relative to the roller 34, so that the holding support 16 is in an approximately horizontal orientation. The placing can be carried out while the carrier suspended from the overhead conveyor 2 is being moved along in the direction of the arrow 12.

Figure 3A:
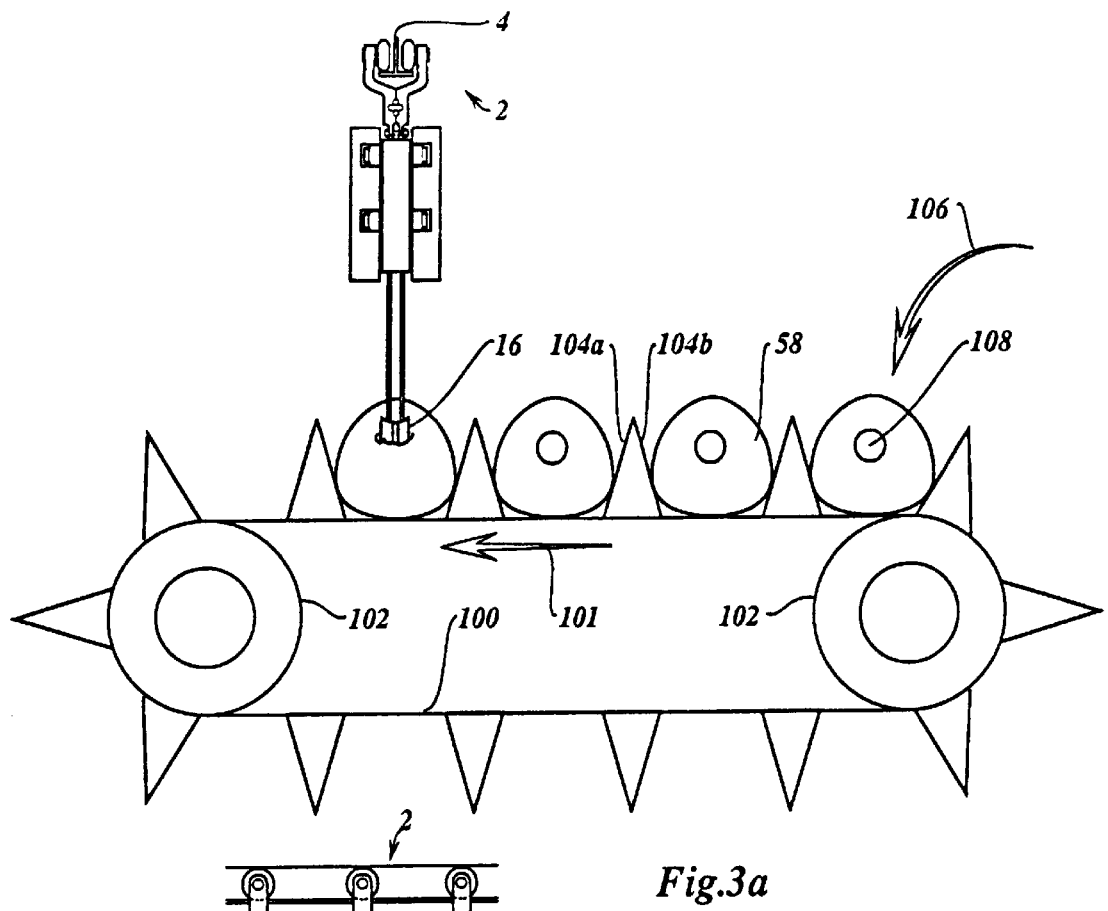

FIG. 3a shows diagrammatically an endless conveyor belt 100 which runs in the direction of arrow 101 over rollers 102, at least one of which is driven. A number of pairs of partitions 104a, 104b are fixed flexibly on the belt 100. The distance between two adjacent pairs of partitions 104a, 104b is selected in such a way that there is space for the accommodation of a front half 58. Such front halves 58 are placed at the point indicated by arrow 106 between two adjacent pairs of partitions 104a, 104b, with the abdominal cavity opening of the front halves 58 facing away from the side shown in FIG. 3a; FIG. 3a therefore shows the side of the neck opening 108 of the front half 58. The rail 4 of an overhead conveyor with carriers according to FIG. 1c is directed at right angles to the direction of movement 101 of the conveyor belt 100. With suitable control of the passage of a holding support 16 over the conveyor belt 100, the holding support 16 passes by way of the abdominal cavity opening into a front half 58, and the holding support 16 takes the front half 58 with it from the conveyor belt 100. The manual placing of a front half 58 on a holding support 16 shown in FIG. 3 can therefore be automated.

Figure 3B:
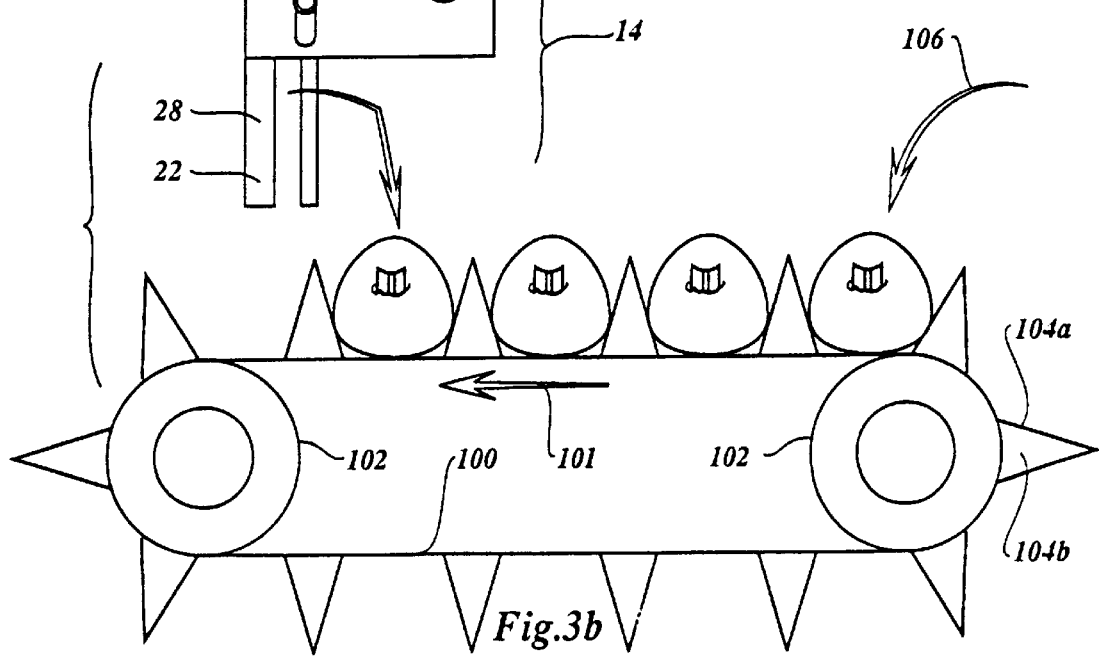

Another method of mechanized placing of a front half on a carrier is illustrated in FIG. 3b. The front halves 58 situated on the conveyor belt 100 have already been provided with a holding support 16. The holding supports 16 are automatically connected (in a manner not shown in any further detail) to arm 22 and lever 28 of the swivelling device 14 during a passage of the carrier over the conveyor belt 100.

In a subsequent processing stage, which is illustrated in FIGS. 4a and 4b, the front half 58, which until then has been fixed only to a slight degree on the holding support 16, is pressed into a completely fixed position on the holding support 16 by a diagrammatically shown pressing device 62 fitted near the path of the front half 58 moving along in the direction of the arrow 12. The pressing device 62 comprises two plates 68 which can be swung down in synchronism on either side of the holding support 16 in the direction of arrow 64 about a shaft 66, the drives and controls of which plates are not shown in any further detail, but can be, for example, pneumatic or electric. The plates 68 of the pressing device 62, which is disposed in a fixed position along the track of the overhead conveyor 2, are held in the swung-down position shown in FIGS. 4a and 4b until the front half 58 has been forced sufficiently far into a fixed position on the holding support 16 by the movement of the holding support 16 in the direction of the arrow 12, as shown in FIG. 5. The plates then spring back to their initial position shown by dashed lines in FIG. 4a.

Figure 5A:
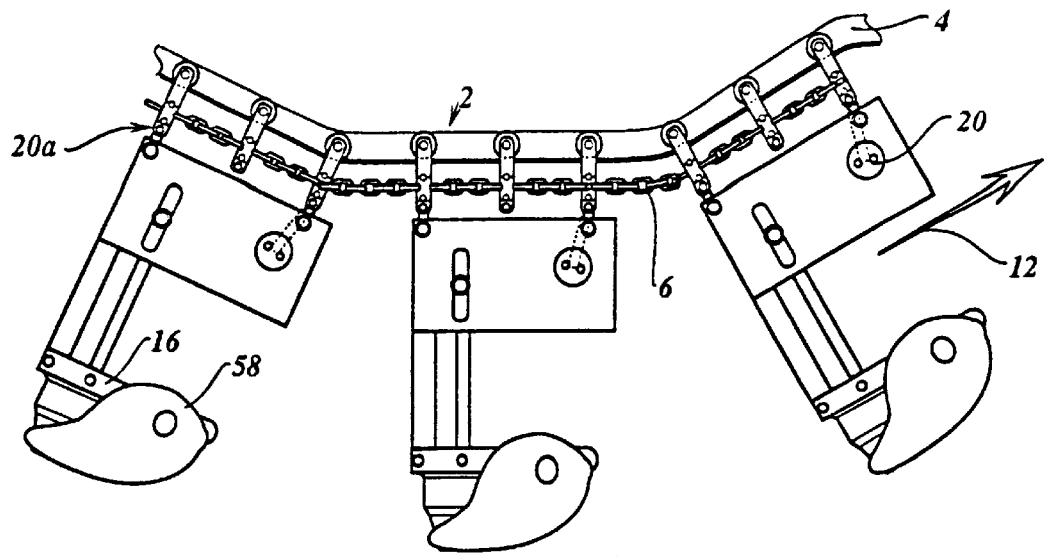
FIG. 5a illustrates a possible overhead conveyance of the carrier according to the invention.

FIG. 5a illustrates the way in which a suitable shape of the rail 4 of the overhead conveyor 2 can be selected to ensure that in a particular part of a filleting line the distance between holding supports 16 of successive carriers, moving along in the direction of the arrow 12, can be increased in order to facilitate the carrying out of filleting operations on the front half 58 or the placing or removal of a front half. The connections 20 and 20a of the carrier, combines with the flexibility of the chain 6, permit movement along the rail 4 without any problems.

Figure 6:
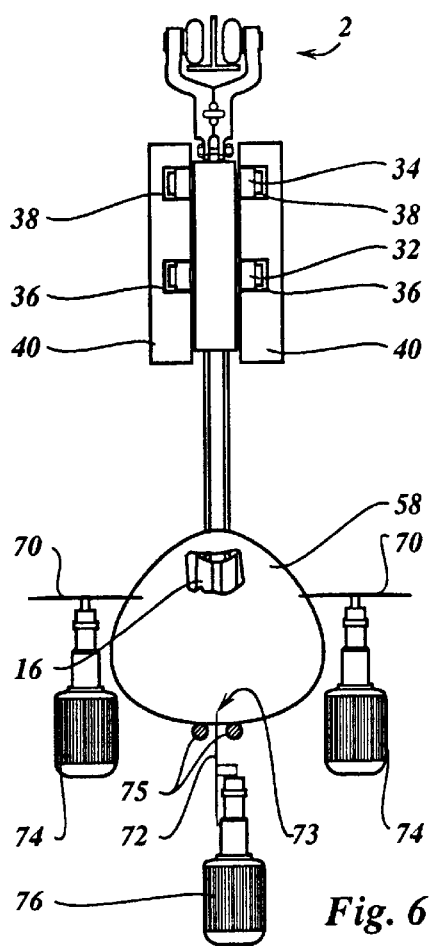
FIGS. 6 and 7 illustrate in front view and side view respectively how an incision is made in a front half.
Figure 7:
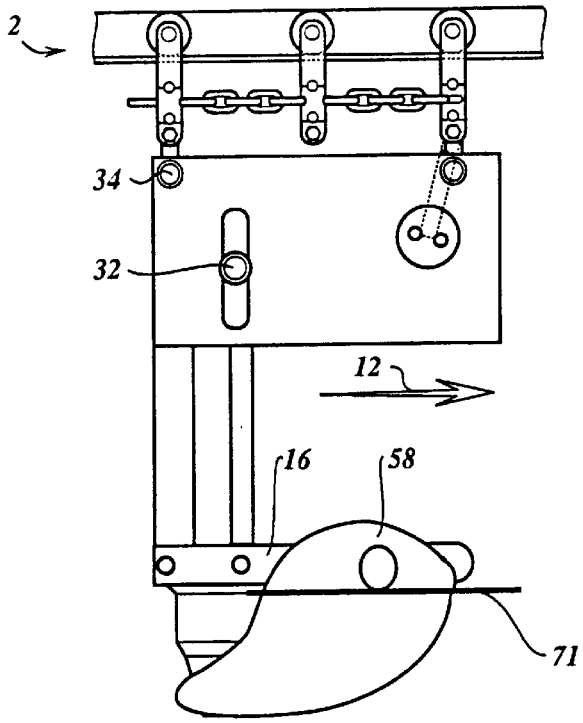

As FIGS. 6 and 7 illustrate, in a horizontal orientation of the holding support 16, obtained by guiding the rollers 32 and 34 in curved tracks 36 and 38 respectively, the front half 58 has incisions made on three sides, i.e. incisions 71 below the shoulder joints at the level of the axillae by means of cutters 70, and an incision 73 through the skin at the level of the breastbone beneath it, by means of a cutter 72, and has elongated guides 75 for determining the incision depth. The cutters 70 and 72 are shown in FIG. 6 as circular cutters driven by motors 74, 76 respectively, but they can also be stationary cutters. The cutting devices 70, 74 and 72, 76 are disposed in a fixed position along the path of the holding support 16, so that the incisions made by them occur through the movement of the carrier in the direction of the arrow 12.

Figure 8:
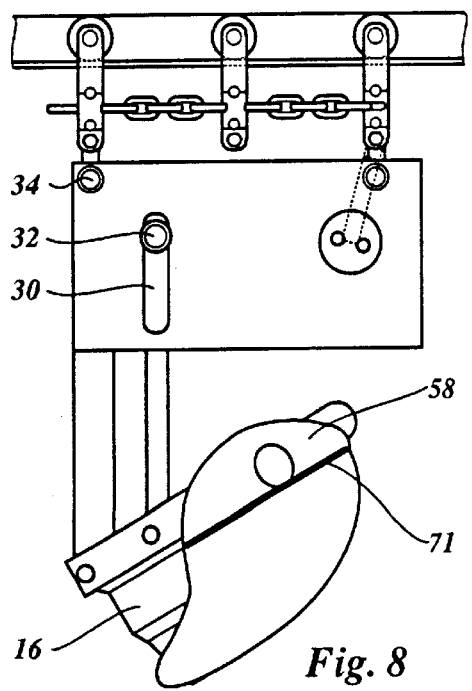
FIGS. 8, 9a and 9b illustrate in side view and front view respectively a skinning operation on a front half.

In order to prepare for the subsequent skinning operation, the holding support 16 is swivelled upwards relative to the rollers 34 by movement of the rollers 32 in the slot 30, as illustrated in FIG. 8.

Figure 9A:
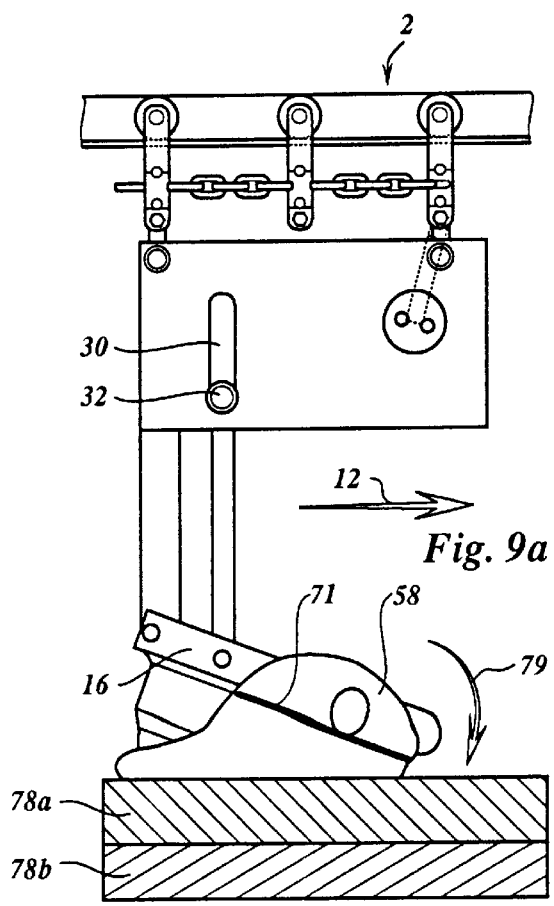
Figure 9B:
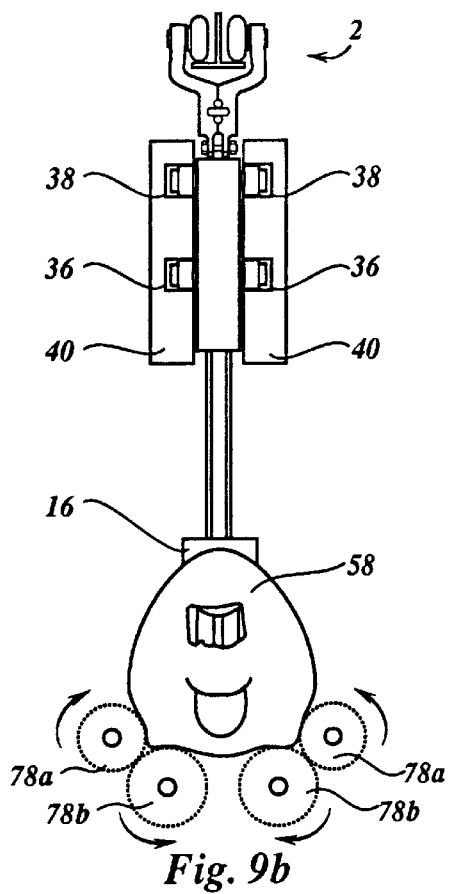

As FIGS. 9a and 9b illustrate further, the front half 58 is taken from the upward directed position illustrated in FIG. 8, on a number of rotating helical rollers 78a, 78b, 78c and 78d (in this case four) provided with helical ribs, by swivelling the holding support 16 in the direction of arrow 79 to its lowest position. In this case the rollers 32 are situated entirely in the bottom of the slot 30. A special control system for reaching this position of the holding support 16 is in fact not necessary, since this position is reached automatically through the action of the force of gravity, even in the absence of a control device 40. The rotating helical rollers 78a and 78b, rotating in opposite directions to each other, remove the skin at the righthand side of the front half 58, while the helical rollers 78c and 78d, rotating in opposite directions to each other, remove the skin at the lefthand side of the front half 58.

Figure 9C:
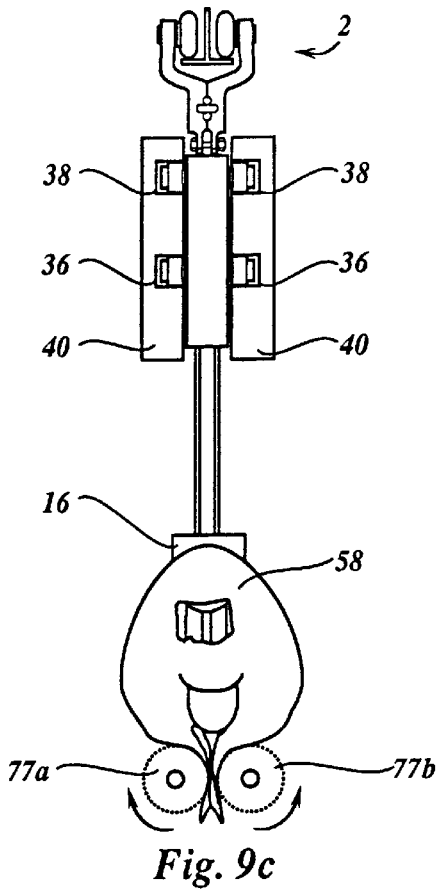
FIG. 9c illustrates in front view a neck region cleaning operation on a front half.

A similar device is shown in FIG. 9c, where the front half 58 on the holding support 16 is placed in a downward directed orientation on two helical rollers 77a and 77b, provided with helical ribs and rotating in opposite directions to each other, for the removal of fat, glands or the like from the neck region of the front half. The tissue to be removed is pulled into the nip between the rollers 77a, 77b.

Figure 10:
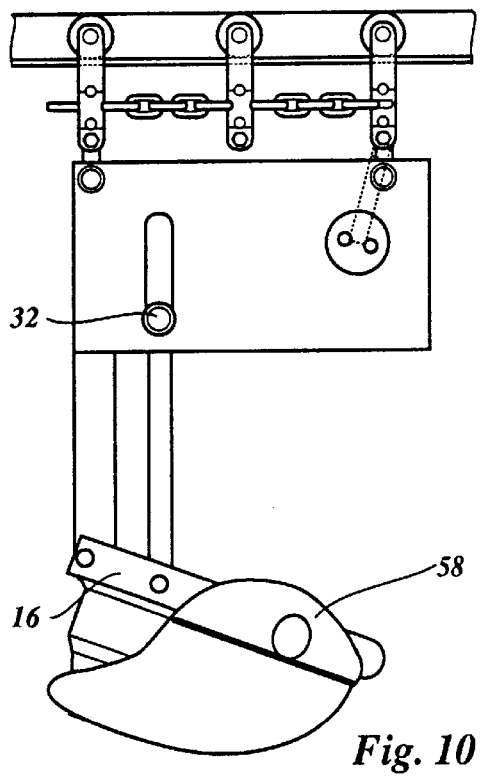
FIGS. 10, 11 and 12 illustrate in side view a cutting operation in the front half.

After the skinning and possibly cleaning of the neck region, the front half 58 remains in the downward swivelled position according to FIG. 9a, as shown in FIG. 10.

Figure 11:
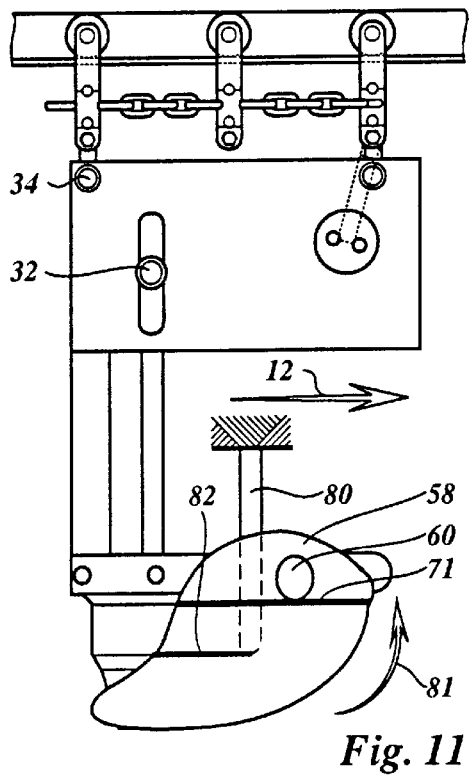
Figure 12:
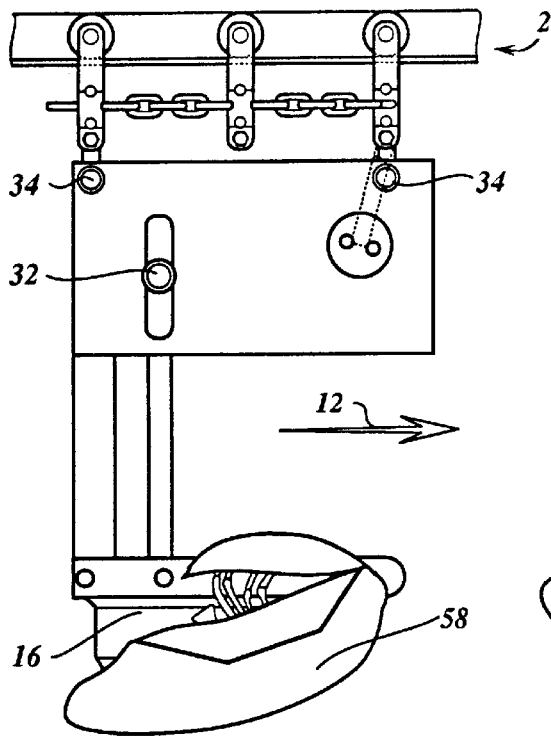

As illustrated in FIG. 11, stationary scrapers 80 are then disposed in a fixed or slightly resilient position along the track of the overhead conveyor 2. By means of a suitable curved track control of the rollers 32 relative to the rollers 34, the holding support 16 with the front half 58 is swivelled in the direction of arrow 81 to the position shown in FIG. 11 at the moment that the shoulder joints 60 of the front half 58 moving in the direction of the arrow 12 have passed the scrapers 80. As a result of this, the scrapers 80 move between the coracobrachialis externus and coracobrachialis internus muscles of the front half 58 and scrape the breast meat away up to the line 82 and up to the processus thoracicus of the carcass, so that the meat hangs down laterally through the effect of gravity, as illustrated in FIG. 12.

Figure 13:
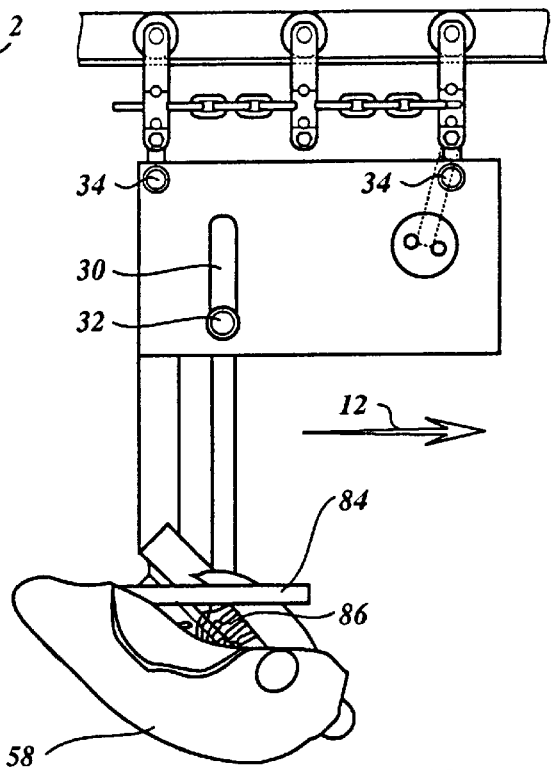
FIGS. 13, 14 and 15 illustrate in side view a scraping operation on the front half.
Figure 14:
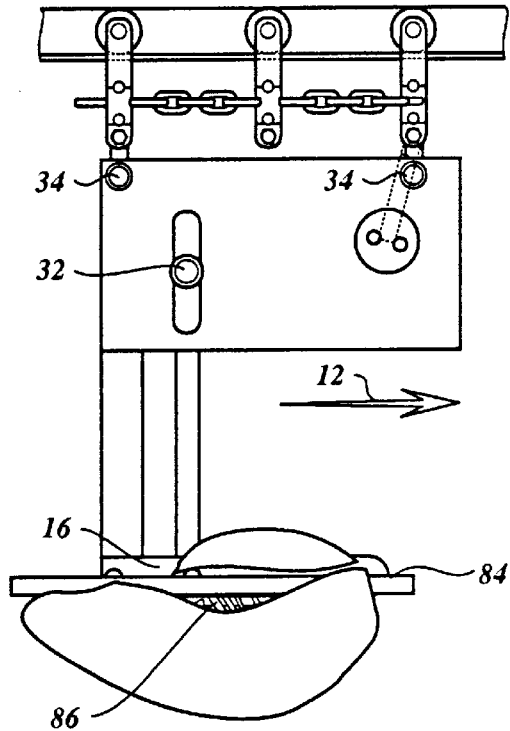
Figure 15:
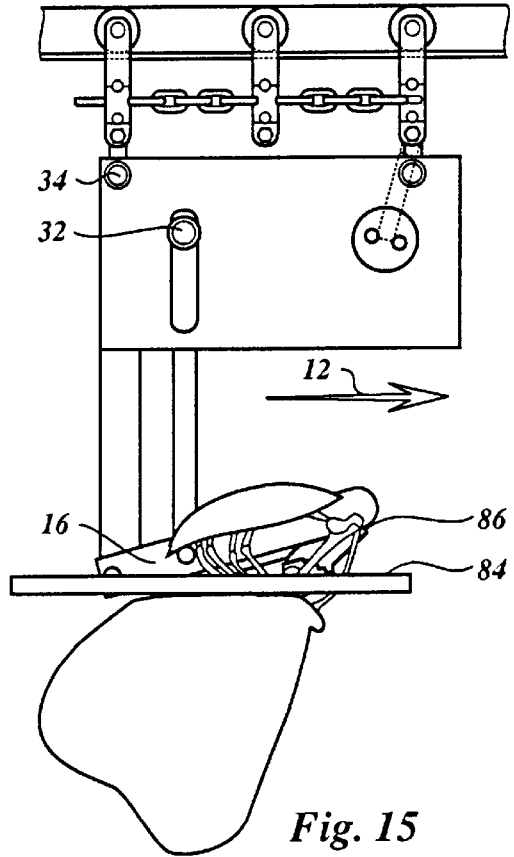

The holding support 16 is then tilted downwards to the position shown in FIG. 13 and guided along one or more scrapers 84 extending essentially parallel to the track of the overhead conveyor, as shown in FIGS. 13, 14 and 15, while the holding support 16 is gradually swivelled upwards by suitable control of the position of the rollers 32 relative to that of the rollers 34, with the result that the meat along the bones of the carcass is scraped away up to the breastbone of the carcass 86, apart from a connection at the breastbone, as illustrated in FIG. 16.

As illustrated further in FIG. 16, the breast meat 88 hanging from the breastbone of the carcass 86 is separated from the carcass 86 by means of a stationary or rotating cutting element 90 disposed in a fixed or resilient manner along the path of the carcass, through the movement of the carrier in the direction of the arrow 12.

As FIG. 17 illustrates, the breast meat 88 can be collected on an endless conveyor belt 92 and discharged for further processing.

After the previous operation, the carcass of the front half still contains back meat, which is indicated by 85 in FIG. 17a, and forms the so-called oyster pieces of the front half. The back meat 85 is removed from the carcass by means of scraping or cutting elements 87 disposed in a fixed or resilient manner along the track of the overhead conveyor 2 and is skinned separately.

Figure 19:
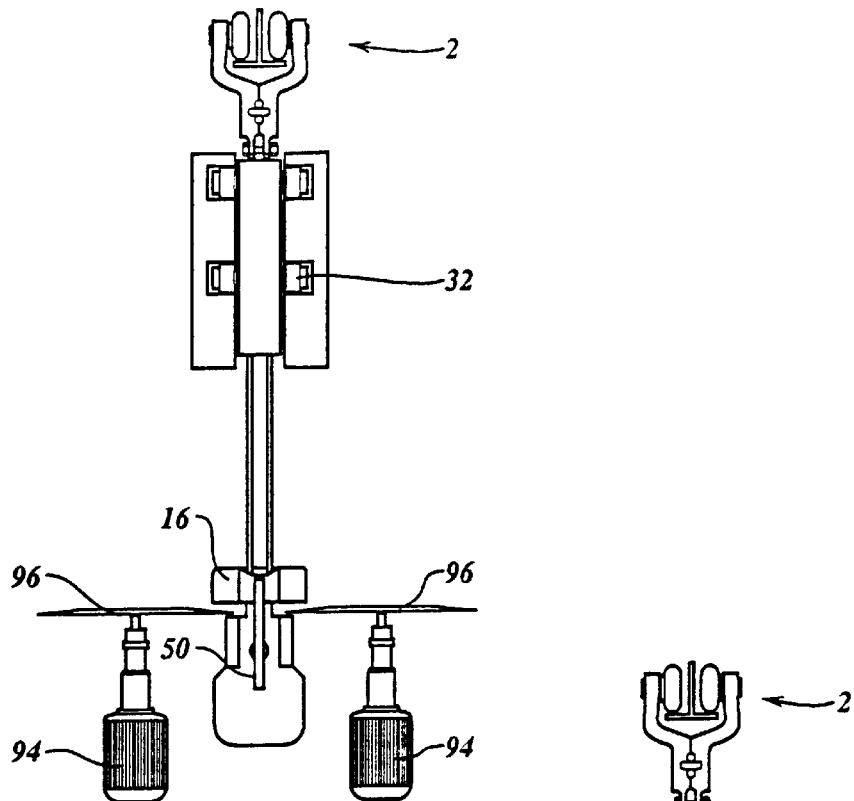

FIGS. 18 and 19 illustrate the removal from the holding support 16 of the carcass 86, with the meat removed therefrom and gripped by the cam 42, and for the sake of clarity the carcass is not shown in FIG. 19. The holding support 16 with the carcass 86 of the front half is conveyed in the direction of the arrow 12 past a set of circular cutters 96 driven by motors 94. The carcass of the front half is separated by said knives into a back half and a breast half. The breast half falls down by gravity from the holding support 16, while the back half lies loose on the top side of the holding support 16 and can be swept away in a simple manner. The holding support 16 is then suitable for reuse as shown in FIGS. 3 et seq.

Figure 20:
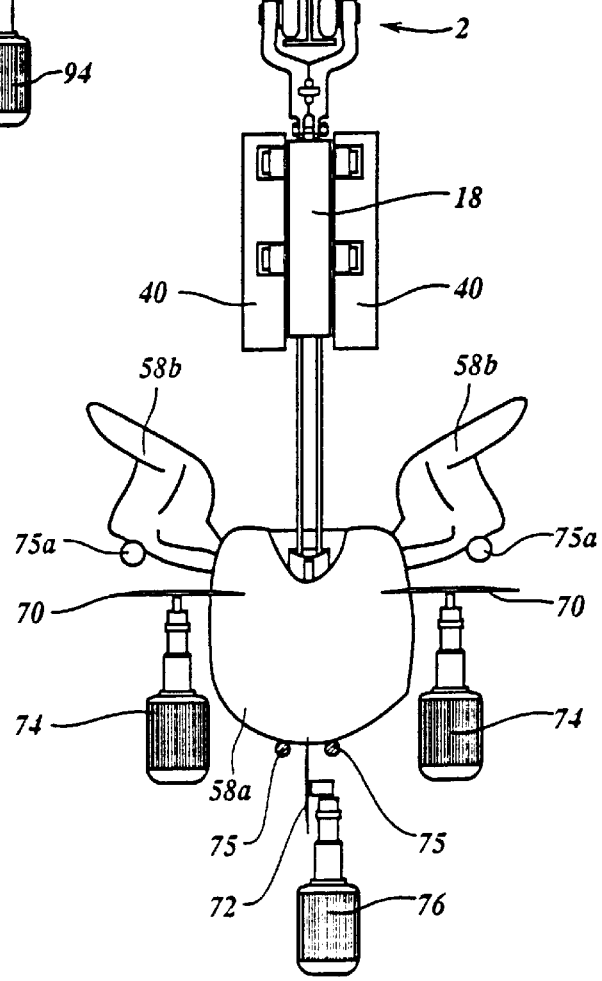
FIG. 20 illustrates an operation for a front half with wings, corresponding to the operation according to FIG. 6.
Figure 21:
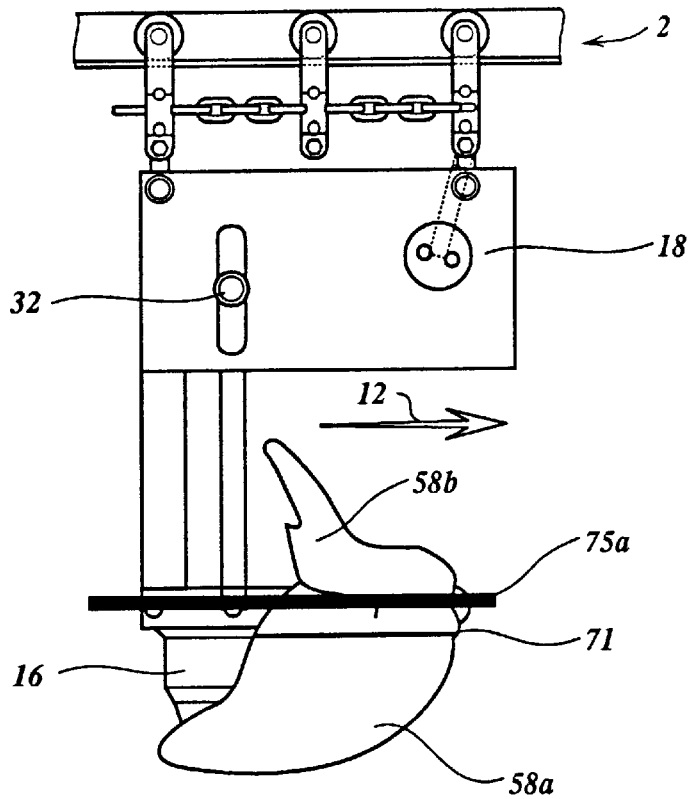
FIG. 21 illustrates an operation for a front half with wings, corresponding to the operation according to FIG. 7.

The operations which are carried out according to FIGS. 20 and 21 on a front half 58a in principle correspond entirely to the operations which are carried out according to FIG. 6. However, the front half 58a according to FIGS. 20 and 21, unlike the front half 58 shown in FIG. 6, still comprises wings 58b, which are held outside the range of the cutters 70 by means of elongated guides 75a.

Figure 22:
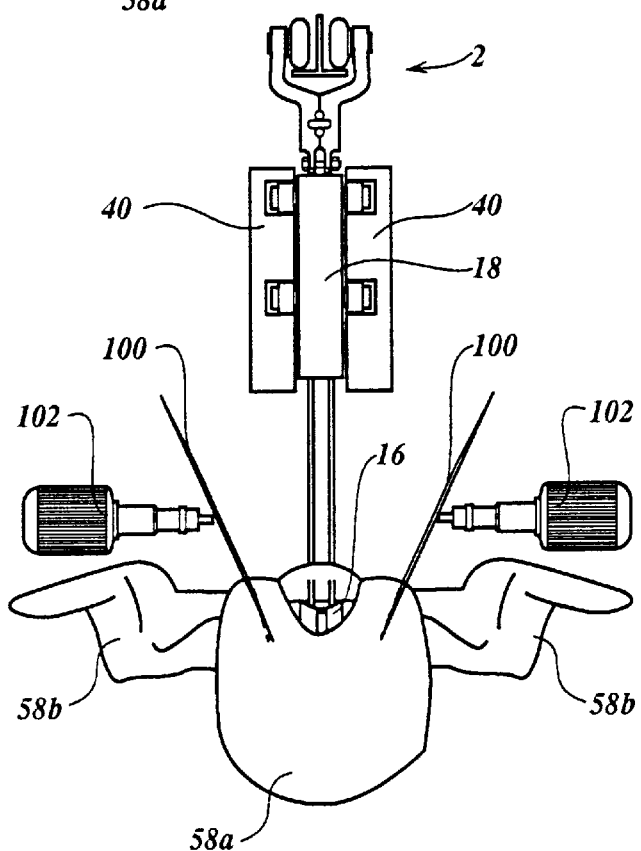
FIG. 22 illustrates in front view the severing of shoulder joints for a front half with wings.

FIG. 22 illustrates the severing of at least part of the shoulder joints of a front half 58a with wings 58b, by means of rotating cutters 100 which are disposed in a fixed or resilient manner along the path of the front half 58a moving along in the direction of the arrow 12, and which are driven by motors 102. The incisions in the shoulder joints can also be made by means of stationary cutters.

As FIGS. 23, 24 and 25 illustrate, after the shoulder incisions according to FIG. 22 have been made, the breast meat of the front half 58a is pressed away from the carcass 86 by placing two stops 104, disposed in a fixed or resilient manner, in the path of the front half 58a moving along in the direction of the arrow 12. The stops 104 each comprise a horizontal stop part 104a and a vertical stop part 104b, which are disposed at the level of the wing part of the shoulder joint of the front half 58a. Swivelling the holding support 16 upwards after contact between the stops 104 and the front half 58a, by moving the rollers 32 relative to the rollers 34, as FIG. 25 illustrates in particular, causes the breast meat to be pressed away from the carcass 86 by means of the wings 58b. Of course, it is also possible to grip the wings for such an operation, and to allow the movement of the carrier in the direction of the arrow 12 to detach the breast meat from the carcass 86. Both cases produce a processing situation which is illustrated in FIG. 26, in which the holding support 16 has been returned again to an essentially horizontally directed orientation by movement of the rollers 32 relative to the rollers 34, and the breast meat hangs from the breastbone.

FIG. 26 illustrates an operation corresponding essentially to the operation according to FIG. 16, for detaching the breast meat and the wings 58b from the carcass 86 by conveying said carcass in the direction of the arrow 12 past a cutting device 106 disposed in a stationary or resilient manner.

Figure 27:
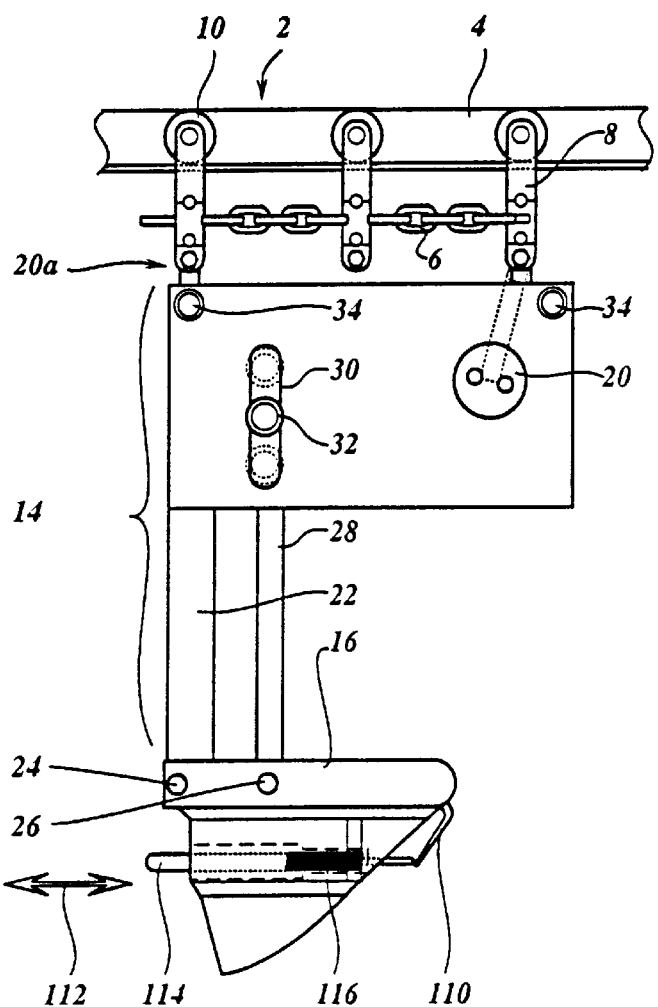
FIG. 27 illustrates in side view a third embodiment of the carrier according to the invention.

FIG. 27 shows a carrier whose swivelling device 14 in principle corresponds entirely to the swivelling device described earlier with reference to FIG. 1a. However, the holding support 16 according to FIG. 27 comprises fixing means which consist of an elongated supporting element 110 which is directed at an acute angle to the surface of the holding support 16, a pin 114 which is movable in the directions of the double arrow 112, and a spring 116. One end of the pin 114 rests under a biasing force of the spring 116 against the supporting element 110. Pulling on the end of the pin 114 situated below the arm 22 causes the end of the pin 114 facing the supporting element 110 to move until it is below the surface of the holding support 16. It is then simple to slide a breast part of slaughtered poultry below the supporting element 110, following which the breast part is secured on the holding support 16 by releasing the pin 114. The supporting element, together with the surface of the holding support 16 facing the supporting element 110, grips around the breast-bone of the breast part.

In the variant of the carrier of FIG. 27 shown in FIGS. 28a, 28b and 28c, provision is made for a control mechanism for the pin 114, the pin 114 being slid or not slid depending on the swivel position of the holding support 16. For this purpose, the arm 22 of the swivelling device 14 is extended to beyond the shaft 24, and is provided with an elongated slot 118 through which the pin 114 projects. A collar 120 is fixed on the pin near the end of the pin 114 facing away from the supporting element 110.

As FIG. 28*b* illustrates, when the holding support 16 is swung upwards as a result of the rollers 32 being moved upwards in the slot 30 relative to the rollers 34, the end of the pin 114 which was resting against the supporting element 110 is withdrawn until it is below the surface of the holding support 16, so that in this orientation of the holding support a breast part of poultry is simple to place on the holding support 16. Tilting back of the holding support to the orientation shown in FIG. 28*a* then leads to securing of the breast part on the holding support 16. The breast part is taken into position for the operations to be illustrated below with reference to FIGS. 29*a*–29*f,* by swivelling the holding support 16 downwards, as illustrated in FIG. 28*c*, in which case the securing of the breast part by means of the pin 114 is retained.

Figure 29A:
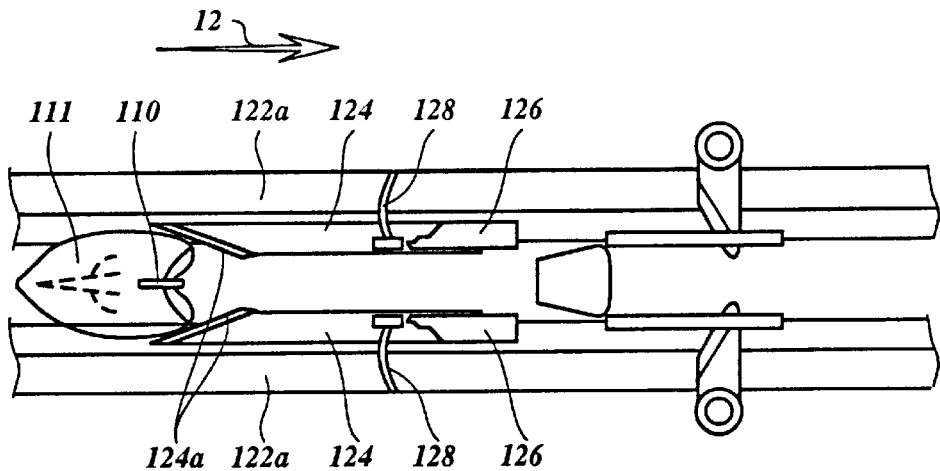
FIGS. 29a–29f show in views from the bottom successive processing steps for filleting a breast part by means of the carrier according to FIG. 27 or 28c.
Figure 29B:
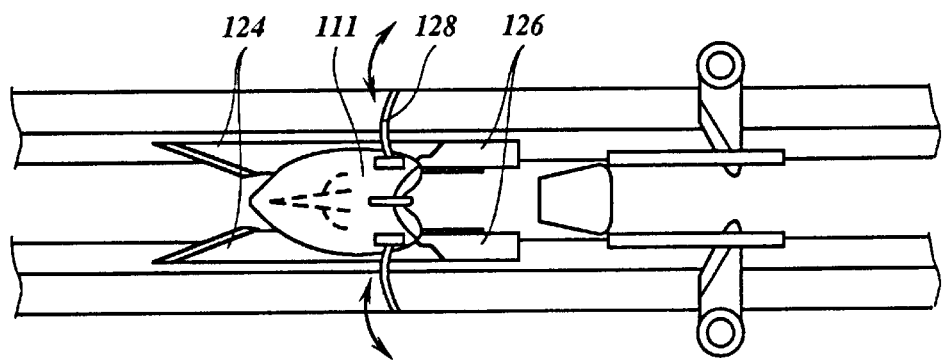
Figure 29C:
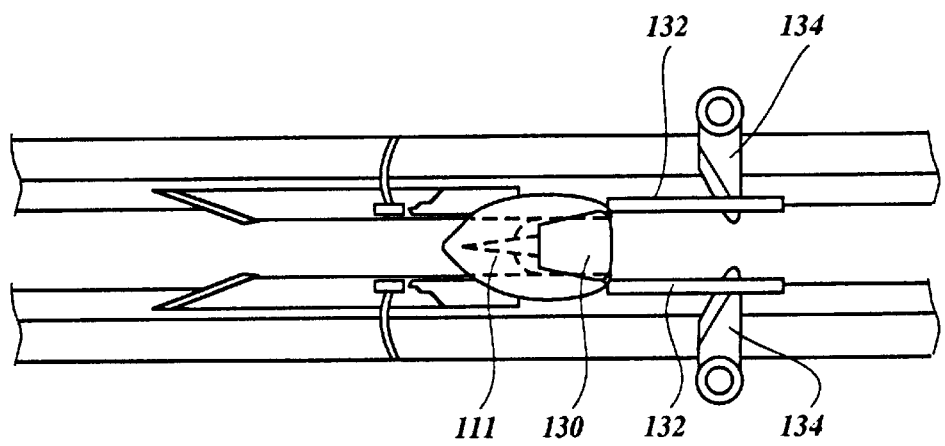
Figure 29D:
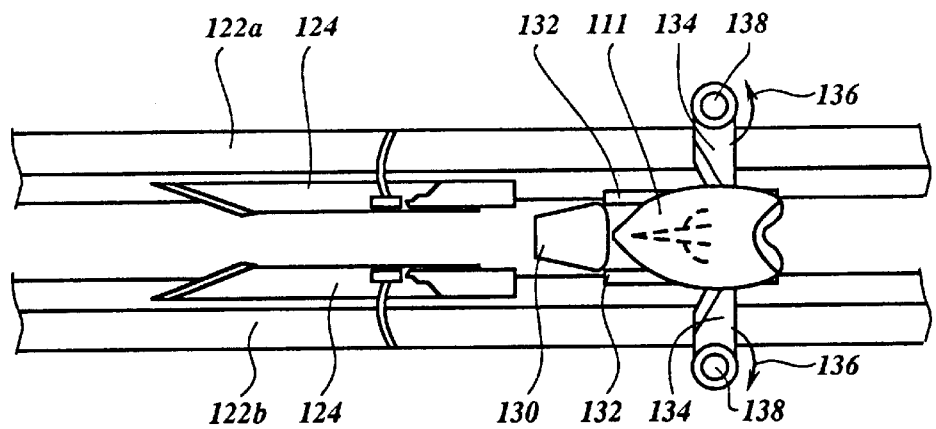

According to FIG. 29*a*, a breast part 111 of poul try fixed on the carrier according to FIG. 28*c* is guided between two elongated bearing parts 122*a,* 122*b* of a frame (not shown in any further detail) of a filleting device. The wishbone has already been removed from the breast part, and incisions have also already been made on either side of the breastbone. As FIGS. 29*a* and 29*b* illustrate, the breast part 111 is guided first on guide plates 124 provided with a run-on edge 124*a*, against which plates the inside of the ribs of the breast part 111 come to rest. The breast part 111 then comes to a set of scraper plates 126, a set of movable shoulder positioning elements 128 being disposed just before the scraper plates 126. As soon as the shoulder joints of the breast part 111 are situated below the shoulder positioning elements 128, the latter go briefly into action in order to press the shoulder joints of the breast part 111 under the scraper plates 126, as illustrated in FIG. 29*b*. Immediately afterwards, the shoulder positioning elements 128 are removed again from the breast part 111, with the result that the meat of the breast part 111 will pass the scraper plates 126 at the side facing away from the guide plates 124. The result of this operation is shown in FIG. 29*c*, in which the outer fillet has been scraped away from the flank of the carcass in the region from the collarbone to beyond the processus thoracicus and up to the connection between the inner fillet and the breast part, as shown by dashed lines. The breast part 111 (see FIG. 29*c*) then encounters a second movable shoulder positioning element 130 and a set of guides 132, followed by a set of cutters 134. The shoulder positioning element 130 ensures that the shoulder joints of the breast part come to rest at the side of the guides 132 facing away from the side shown in the drawing, by exerting brief pressure on the shoulder joints directly before they reach the guides 132. The part of the breast meat already scraped away from the breast part 111 is then situated at the other side of the guides 132. The cutters 134 directly adjoin the guides 132 and ensure that an incision is made over the collarbone of the breast part up to the processus thoracicus, in order to cut away meat around the collarbone and sever the membrane between the fillet and the carcass. To this end, the cutters 134 are controlled in such a way that on reaching the processus thoracicus they swivel away in the direction of arrows 136 about shafts 138 (see FIG. 29*d*). If the cutters 134 are disposed in a fixed position, the latter incision, of course, runs almost to the belly side of the breast part 111.

Figure 29E:
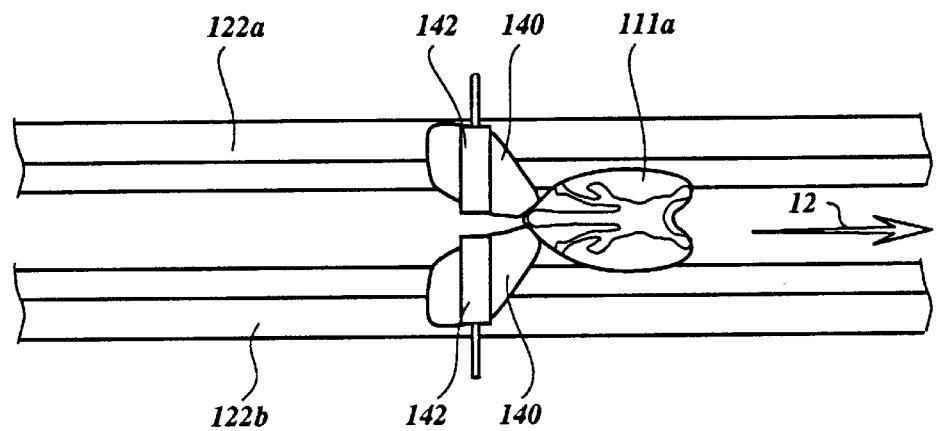

As FIG. 29*e* illustrates, the fillets 140 of the breast part 111 are then gripped by means of only diagrammatically shown gripping elements 142, so that the fillets 140 are pulled away entirely—or partially if the gripping elements 142 in time release the grip—from the carcass 111*a* by the movement of the breast part fixed on the carrier in the direction of the arrow 12. If the cutters 134 are designed so that they can swivel, as described with reference to FIG. 29*d*, the fillets obtained comprise fat at the belly side. On the other hand, if the cutters 134 are disposed in a fixed position, the above fat at the belly side remains behind on the carcass 111*a*.

Figure 29F:
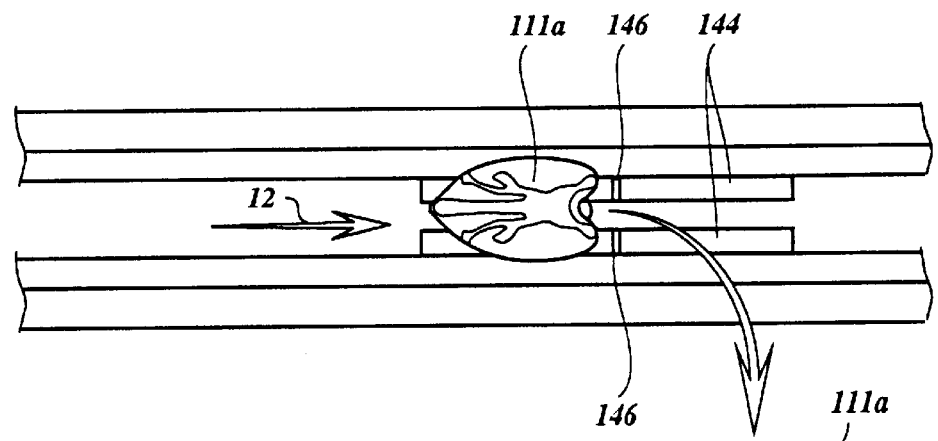

FIG. 29*f* illustrates the ejection of a carcass from which fillets have been removed, by means of guides 144 which follow the path of an upward swivelling holding support according to FIG. 28*b* and are provided with stops 146. When the holding support 16 is swivelled upwards, the securing by pin 114 of the carcass 111*a* of the breast part will be undone, following which the carcass 111*a* is retained relative to the holding support 16 by the stops 146 and falls down from the guides 144, and can be discharged.

While the invention has been described and illustrated in its preferred embodiments, it should be understood that departures may be made therefrom within the scope of the invention, which is not limited to the details disclosed herein.

What is claimed is:

1. Apparatus for moving a slaughtered animal or part thereof, comprising:
    (a) an overhead conveyor,
    (b) an elongated holder for the slaughtered animal or a part thereof connected to the overhead conveyor and having an end that alternatively can be directed in, or at an acute angle relative to, the direction of travel of the conveyor,
    (c) a structure for fixing the slaughtered animal or part thereof on the holder,
    (d) a swiveling device attached to the holder and the overhead conveyor and
    (e) a control disposed along the path of the overhead conveyor for actuating the swiveling device to swivel the holder.

2. The apparatus of claim 1, wherein the swiveling device is adapted for swiveling the holder in a vertical plane.

3. The apparatus of claim 1, wherein the swiveling device further comprises at least one projection with an axis extending essentially at right angles relative to the path of the conveyor.

4. The apparatus of claim 3, further comprising at least one stabilizer projection attached to the swiveling device and wherein the control has at least one slot for receiving the stabilizer projection to stabilize the swiveling device.

5. The apparatus of claim 3, wherein the projection is movable by the control essentially at a right angle relative to the axis of the projection.

6. The apparatus of claim 5, wherein the holder is pivotably connected to the swiveling device and the projection is connected to a lever connected to the holder.

7. The apparatus of claim 5, wherein the control has at least one slot for receiving and operating the projection.

8. The apparatus of claim 1, wherein the holder has two opposed sides and at least one slot in each side extending essentially in the direction of conveyance when the holder is in a particular swivel position, and further comprising a cutter positioned along the path of the conveyor and proximate each slot for severing a slaughtered animal or part thereof positioned on the holder.

9. The apparatus of claim 1, further comprising a structure for flexibly suspending the apparatus from the conveyor at at least two points.

10. Apparatus for moving a slaughtered animal or part thereof along an overhead conveyor, comprising:
   (a) a holder for the slaughtered animal or a part thereof,
   (b) a structure for fixing the slaughtered animal or part thereof on the holder, wherein the fixing structure comprises at least one toothed cam movable relative to the holder to grip the inside of the slaughtered animal or the part thereof,
   (c) a swiveling device attached to the holder and the overhead conveyor and
   (d) a control disposed along the path of the overhead conveyor for actuating the swiveling device to swivel the holder.

11. The apparatus of claim 10, wherein the cam is adapted to grip the inside of the slaughtered animal or the part thereof in the region of the breastbone or spinal column.

12. The apparatus of claim 10, wherein the cam teeth are barbed.

13. Apparatus for moving a slaughtered animal or part thereof along an overhead conveyor, comprising:
   (a) a holder for the slaughtered animal or a part thereof,
   (b) a structure for fixing the slaughtered animal or part thereof on the holder,
   (c) a swiveling device attached to the holder and the overhead conveyor,
   (d) a control disposed along the path of the overhead conveyor for actuating the swiveling device to swivel the holder, and
   (e) a press disposed along the conveyor path for pressing the slaughtered animal or part thereof onto the holder.

14. The apparatus of claim 13, wherein the press comprises stops which are disposed along the path of the conveyor and can be inserted into the path of the slaughtered animal or the part thereof.

15. Apparatus for moving a slaughtered animal or part thereof along an overhead conveyor, comprising:
   (a) a holder for the slaughtered animal or a part thereof, wherein the holder has a surface,
   (b) a structure for fixing the slaughtered animal or part thereof on the holder, comprising:
      (i) an elongated supporting element positioned generally parallel to, or at an acute angle with, the holder surface and
      (ii) a pin having one end and movable in its lengthwise direction so that, urged by a biasing force, the one end can project from the holder surface against the supporting element,
   (c) a swiveling device attached to the holder and the overhead conveyor and
   (d) a control disposed along the path of the overhead conveyor for actuating the swiveling device to swivel the holder.

16. The apparatus of claim 15, wherein the pin is moved by swiveling movement of the holder so that in a first position the end of the pin is below the holder surface and in a second position the end of the pin projects from the holder surface.

17. Apparatus for moving a slaughtered animal or part thereof along an overhead conveyor, comprising:
   (a) a holder for the slaughtered animal or a part thereof,
   (b) a structure for fixing the slaughtered animal or part thereof on the holder,
   (c) a swiveling device attached to the holder and the overhead conveyor and
   (d) a control disposed along the path of the overhead conveyor for actuating the swiveling device to swivel the holder, and
   (e) a structure for flexibly suspending the apparatus from the conveyor at, at least two points, the suspension structure comprising at least two trolleys movable along a rail and interconnected by a flexible link.

* * * * *